United States Patent
Wong et al.

(10) Patent No.: US 12,075,486 B2
(45) Date of Patent: *Aug. 27, 2024

(54) METHOD AND DEVICE FOR COMMUNICATING WITH A SELECTED TRANSPORT BLOCK SIZE

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,740

(22) Filed: Dec. 19, 2022

(65) Prior Publication Data

US 2023/0122044 A1    Apr. 20, 2023

Related U.S. Application Data

(63) Continuation of application No. 17/054,507, filed as application No. PCT/EP2019/061393 on May 3, 2019, now Pat. No. 11,533,760.

(30) Foreign Application Priority Data

May 11, 2018    (EP) .................................... 18171936

(51) Int. Cl.
*H04W 72/0446*    (2023.01)
*H04W 72/1263*    (2023.01)
(Continued)

(52) U.S. Cl.
CPC ... *H04W 74/0833* (2013.01); *H04W 72/0446* (2013.01); *H04W 72/1263* (2013.01); *H04W 72/535* (2023.01); *H04W 74/008* (2013.01)

(58) Field of Classification Search
CPC ......... H04W 74/0833; H04W 72/0446; H04W 72/1263; H04W 72/535; H04W 74/008; H04W 74/0836; H04W 74/0838
See application file for complete search history.

(56) References Cited

U.S. PATENT DOCUMENTS

| | | | |
|---|---|---|---|
| 2007/0206531 A1 | 9/2007 | Pajukoski et al. | |
| 2016/0198507 A1* | 7/2016 | Wu ....................... | H04W 8/005 370/330 |

(Continued)

FOREIGN PATENT DOCUMENTS

| | | |
|---|---|---|
| WO | 2019/192940 A1 | 10/2019 |
| WO | 2019/200519 A1 | 10/2019 |

OTHER PUBLICATIONS

International Search Report and Written Opinion received for PCT Application No. PCT/EP2019/061393, mailed on Jun. 12, 2019, 11 pages.

(Continued)

*Primary Examiner* — Un C Cho
*Assistant Examiner* — Lalita W Pace
(74) *Attorney, Agent, or Firm* — XSENSUS LLP

(57) ABSTRACT

A method of operating a communications device in a wireless communications system that supports a random access procedure. The method comprises receiving, from an infrastructure equipment, a scheduling message comprising an indication of an allocation of radio resources to be used for a random access procedure message, selecting a transport block size (TBS) from a plurality of permitted TBS values for the transmission of the random access procedure message, and determining whether the selected TBS is lower than a maximum TBS of the plurality of permitted TBS values. If it is determined that the selected TBS is lower than the maximum TBS, the method comprises selecting a time for starting the transmission of the random access procedure (Continued)

message from a plurality of permitted starting transmission times, and transmitting the random access procedure message to the infrastructure equipment in the allocated communications resources using the selected TBS.

16 Claims, 10 Drawing Sheets

(51) Int. Cl.
  *H04W 72/50* (2023.01)
  *H04W 74/00* (2009.01)
  *H04W 74/0833* (2024.01)

(56) References Cited

U.S. PATENT DOCUMENTS

| | | |
|---|---|---|
| 2018/0102890 A1 | 4/2018 | Yi et al. |
| 2019/0045554 A1 | 2/2019 | Ye et al. |
| 2019/0159197 A1 | 5/2019 | Shrestha et al. |
| 2019/0215872 A1 | 7/2019 | Park et al. |
| 2020/0059390 A1 | 2/2020 | Zhang et al. |
| 2020/0195383 A1 | 6/2020 | Liu et al. |
| 2020/0344818 A1 | 10/2020 | Höglund et al. |
| 2020/0374920 A1 | 11/2020 | Tie et al. |
| 2020/0413389 A1 | 12/2020 | Liu et al. |
| 2021/0014860 A1 | 1/2021 | Wang et al. |
| 2021/0058823 A1* | 2/2021 | Liu ................... H04L 5/0053 |

OTHER PUBLICATIONS

Holma et al., "LTE for UMTS OFDMA and SC-FDMA Based Radio Access", System Architecture Based on 3GPP SAE, 2009, pp. 25-27.

Sony, "On Early Data Transmission over Message 3", 3GPP TSG RAN WG1, Meeting No. 92bis R1-1804603, Sanya China, Apr. 16-20, 2018, 3 pages.

III (Institute for Information Industry), "TBS Determination for Early Data Transmission", 3GPP TSG RAN WG1 Meeting No. 92bis, R1-1805132, Sanya China, Apr. 16-20, 2018, 5 pages.

Huawei et al., "Updated Feature lead summary of EDT during RACH in feNB-IoT", 3GPP TSG RAN WG1 Meeting No. 92bis, R1-1805409, Sanya China, Apr. 16-20, 2018, 13 pages.

Ericsson, "Revised WID for Further Enhanced MTC for LTE", 3GPP TSG RAN Meeting No. 73 RP-161464 revision of RP-161321, New Orleans, USA, Sep. 19-22, 2016, 6 pages.

Huawei et al., "Revised work item proposal: Enhancements of NB-IoT", 3GPP TSG RAN Meeting No. 73, RP-161901 revision of RP-161324, New Orleans, USA, Sep. 19-22, 2016, 8 pages.

Ericsson et al., "New WID on Even further enhanced MTC for LTE", 3GPP TSG RAN Meeting No. 75, RP-170732 revision of RP-170465, Dubrovnik, Croatia, Mar. 6-9, 2017, 4 pages.

Huawei et al., "New WID on Further NB-IoT enhancements", 3GPP TSG RAN Meeting No. 75 RP-170852, Dubrovnik, Croatia, Mar. 6-9, 2017, 6 pages.

Huawei et al., "Early data transmission for eFeMTC," 3GPP TSG RAN WG1 Meeting #92bis, R1-1803884, Sanya, China, Apr. 16-20, 2018, pp. 1-7 (Year: 2018).

Ericsson, "Early data transmission for MTC," 3GPP TSG RAN WG1 Meeting #92bis, R1-1804121, Sanya, China, Apr. 16-20, 2018, pp. 1-6 (Year: 2018).

Mediatek Inc., "Early Data Transmission TBS Determination," 3GPP TSG RAN WG1 Meeting #92bis, R1-1804143, Sanya, China, Apr. 16-20, 2018, pp. 1-4 (Year: 2018).

* cited by examiner

METHOD AND DEVICE FOR COMMUNICATING WITH A SELECTED TRANSPORT BLOCK SIZE

CROSS-REFERENCE TO RELATED APPLICATIONS

The present application is a continuation of U.S. application Ser. No. 17/054,507, filed Nov. 10, 2020, which is based on PCT filing PCT/EP2019/061393, filed May 3, 2019, which claims priority to EP 18171936.0, filed May 11, 2018, the entire contents of each are incorporated herein by reference.

BACKGROUND

Field of Disclosure

The present disclosure relates to methods and various telecommunications apparatus for the communication of random access procedure messages.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things" or IoT for short. The Third Generation Partnership Project (3GPP) has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY OF THE DISCLOSURE

The present disclosure can help address or mitigate at least some of the issues discussed above as defined in the appended claims.

Embodiments of the present technique relate to communications devices, infrastructure equipment and circuitry for and methods of operating the same, and can provide a method of operating a communications device in a wireless communications system that supports a random access procedure. The method comprises receiving, from an infrastructure equipment of the wireless communications system, a scheduling message comprising an indication of an allocation of radio resources to be used for a random access procedure message for the random access procedure, selecting a transport block size, TBS, from a plurality of permitted TBS values for the transmission of the random access procedure message, each of the plurality of permitted TBS values being associated with a repetition number, the repetition number being a maximum number of times that the random access procedure message can be transmitted in the allocated radio resources for the each of the permitted TBS values, and determining whether the selected TBS is lower than a maximum TBS of the plurality of permitted TBS values. If it is determined that the selected TBS is lower than the maximum TBS, the method comprises selecting a starting transmission time for starting the transmission of the random access procedure message from a plurality of permitted starting transmission times associated with the selected TBS, and transmitting the random access procedure message to the infrastructure equipment in the allocated communications resources using the selected TBS, the repetition number associated with the selected TBS, and the selected starting transmission time.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
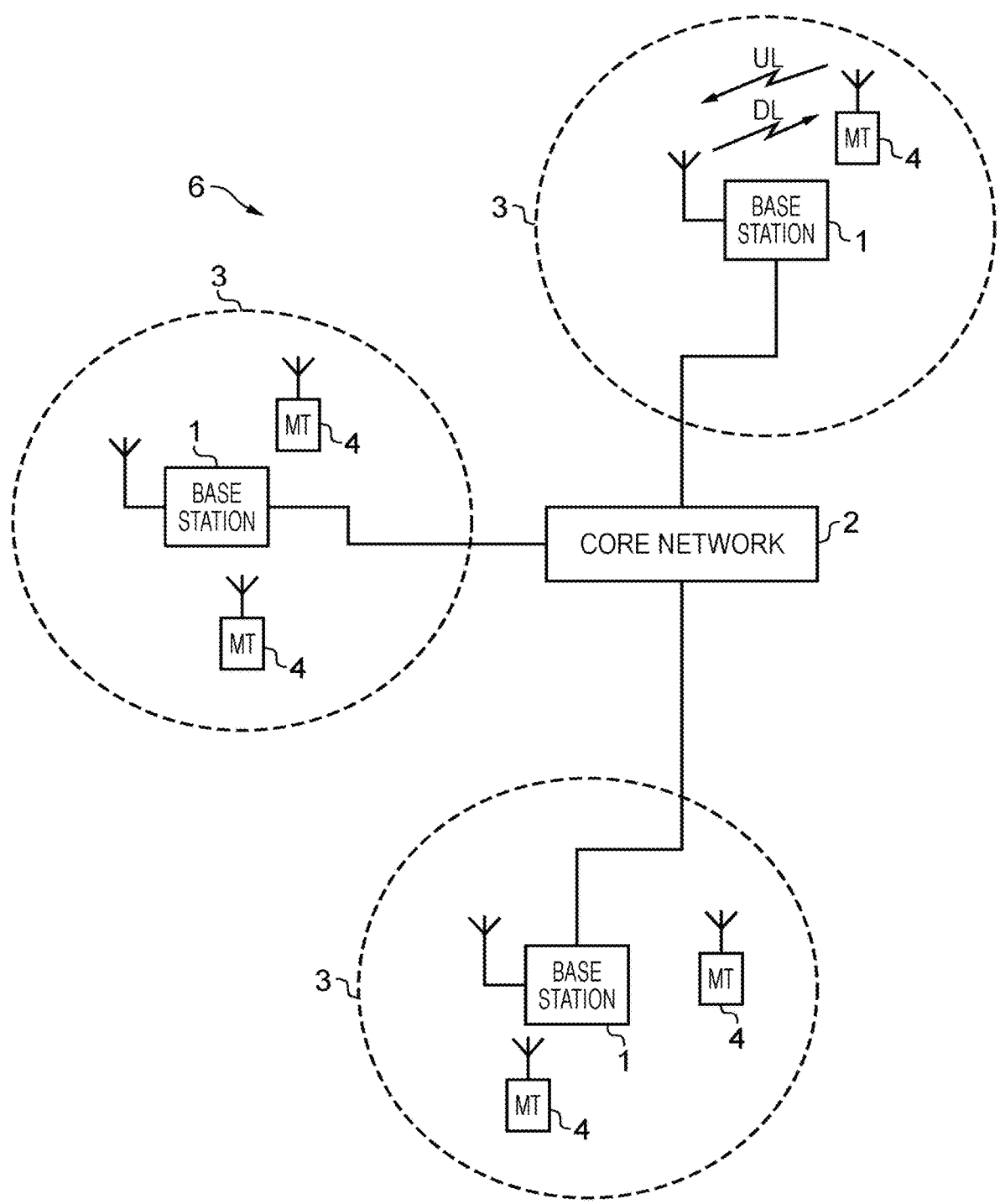
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from base stations 1 to communications devices 4 within their respective coverage areas 3 via a radio downlink (DL). Data is transmitted from communications devices 4 to the base stations 1 via a radio uplink (UL). The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
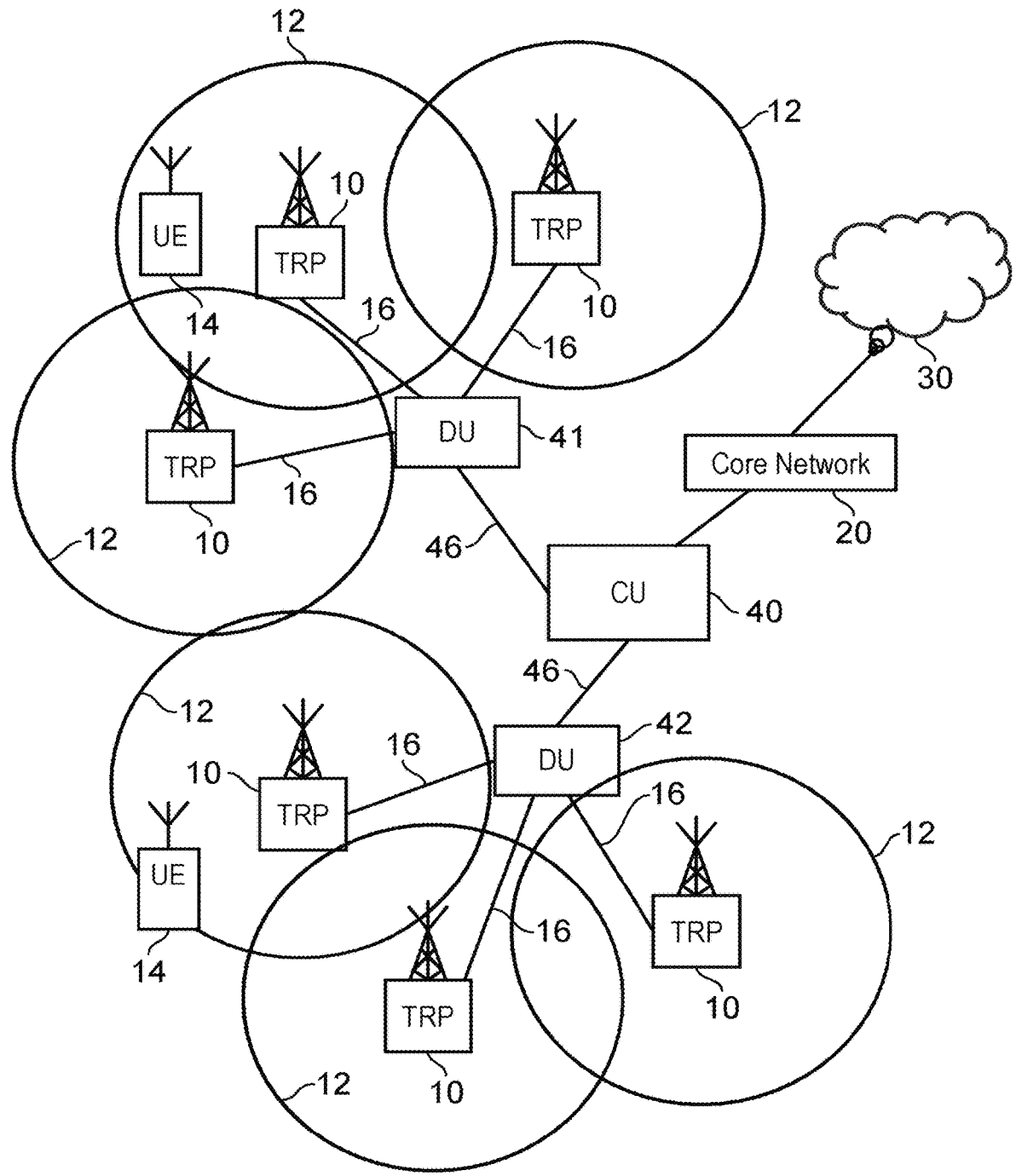
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a line 12. As such wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 of the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Random Access (RACH) Procedure and Early Data Transmission (EDT)

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may move to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access preamble (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection. This can be particularly helpful for infrequent and short messages type of traffic, since EDT would reduce the high overhead for RRC signaling in establishing an RRC connection and performing an RRC disconnection.

One of the many uses for IoT is to provide infrequent reports and receive infrequent commands from the network, e.g. sensors and utility meters, and the IoT device (i.e. UE) is expected to be in power saving mode or long DRX most of the time to conserve battery power. Hence, when there is data to transmit or receive, due to the long DRX, the UE would need to reacquire synchronisation, update system information and connect to the network to perform the data exchange, which can take a long time and therefore consume a lot of battery power. Recognising this, one of the objectives for Rel-15 IoT (efeMTC and feNB-IoT) is to reduce the latency for data transmission, which consists of reducing system acquisition time (i.e. synchronisation and updating System Information) and enabling EDT.

Figure 3:
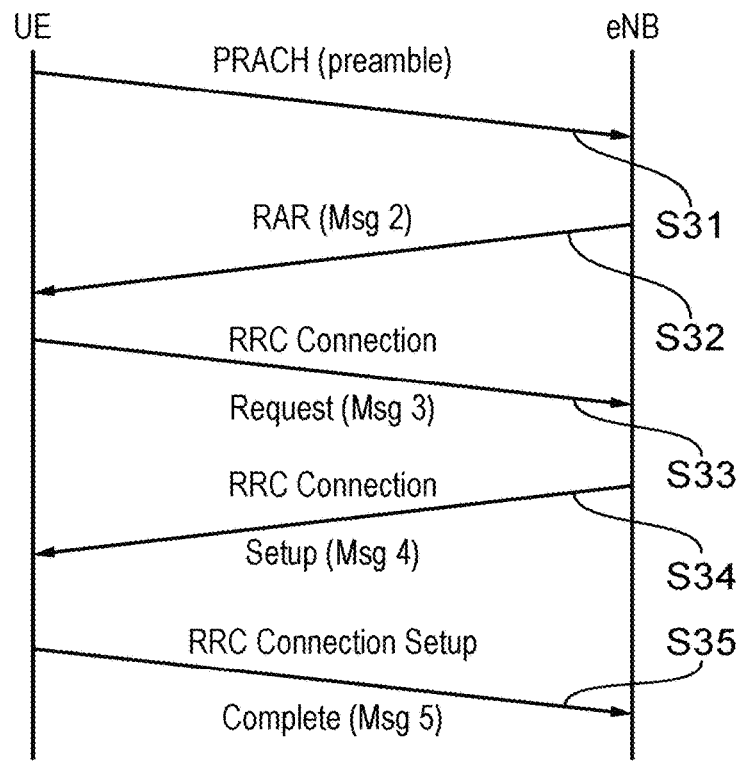
FIG. 3 schematically represents an example random access procedure for use by different types of terminal device.

FIG. 3 is a ladder diagram that schematically shows message exchange between a UE and an eNodeB in a typical random access procedure to establish an RRC connection, in this example in an LTE-based network. The UE starts the process in step S31 by transmitting a random access request on a physical random access channel (PRACH in an LTE context), i.e. a random access preamble (RACH preamble), to the eNodeB. In step S32, when the eNodeB detects this preamble it will respond with a Random Access Response message (RAR), which is also known as Message 2. The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S31, and the RAR will indicate which preamble the eNodeB has detected and is responding to. It may be noted that it is possible that multiple UEs may transmit a random access request using the same PRACH preamble and in the same time and frequency resources. The RAR of step S32 also contains an uplink grant for the preamble the network is responding to so that the UE that transmitted the preamble may use this uplink grant to transmit an RRC Connection Request message, also known as Message 3 to the eNodeB, in step S33. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNodeB will respond to Message 3, in step S34, with Message 4 which carries an RRC Connection Setup message.

For the case where multiple UEs use the same preamble, Message 4 provides contention resolution functionality, for example using a terminal device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step S35 containing an RRC Connection Setup Complete message.

A previously proposed approach for EDT in uplink is for additional data to be transmitted in association with the RRC connection request message, in Message 3 (step S33 in FIG. 3). For the legacy approach to random access, Message 3 carries only control messages and therefore has a limited Transport Block Size (TBS). In order for Message 3 to carry more useful amounts of data, the 3GPP group has agreed to allow for an increase in the TBS for Message 3 to approximately 1000 bits. An EDT UE is distinguished from a legacy UE by the preamble used. That is, a set of PRACH resources, including preambles, are reserved for an EDT UE so that the eNodeB is able to recognise which UE is requesting or is capable of EDT.

The EDT message from the UE can have different sizes depending on the application. Although the eNodeB can recognise an EDT request via the PRACH resource (preamble), it does not know the size of the EDT message. In order to ensure the EDT message can be transmitted, the eNodeB is likely to schedule the largest TBS (e.g. 1000 bits) for the EDT UE (note that this scheduling can be semi-static, i.e. via RRC signaling and hence applying to any EDT transmission from UEs, or dynamic, i.e. via an UL grant message in a RAR Msg 2). If the EDT message is small, e.g. 300 bits, then the UE would have to insert padding bits for the remaining (i.e. unused) allocated bits in the scheduled TBS. This would result in a waste of UE resource and power since it needs sufficient resources (e.g. repetitions) to transmit the large TBS. Recognising this, 3GPP agreed that the EDT UE can select a TBS out of up to 4 possible TBS for its EDT message, that is to say, for EDT transmission the TBS for Message 3 is variable. Hence, the UE can select the TBS (from the 4 possible TBS) that is closest to its EDT message size and therefore minimises padding bits.

3GPP also agreed that the eNodeB can broadcast a maximum TBS in the SIBs for each RACH CE level. There are 8 possible maximum TBS values that the eNodeB can select from, i.e.:

{328 408 504 600 712 808 936 1000} for PRACH levels 0 and 1

{328 408 456 504 600 712 808 936} for PRACH levels 2 and 3.

A lookup table is agreed in 3GPP, where for each of these 8 TBS values, there are 4 corresponding TBS values including the broadcasted maximum TBS value that the UE can select for EDT.

In co-pending European patent application with application number EP18166211.5 [6], it is recognised that different TBS would require different numbers of resources (frequency/time) and that the UL grant in the RAR is limited in size. It is therefore proposed in [6] that the resources indicated in the RAR's UL grant is for the maximum TBS and the resources are reduced if smaller TBS is selected by the UE. In an example embodiment of [6], it is suggested that the scheduled PRB (frequency resources) is maintained but the repetition is reduced when a smaller TBS is selected. This has been subsequently agreed in 3GPP.

Figure 4:
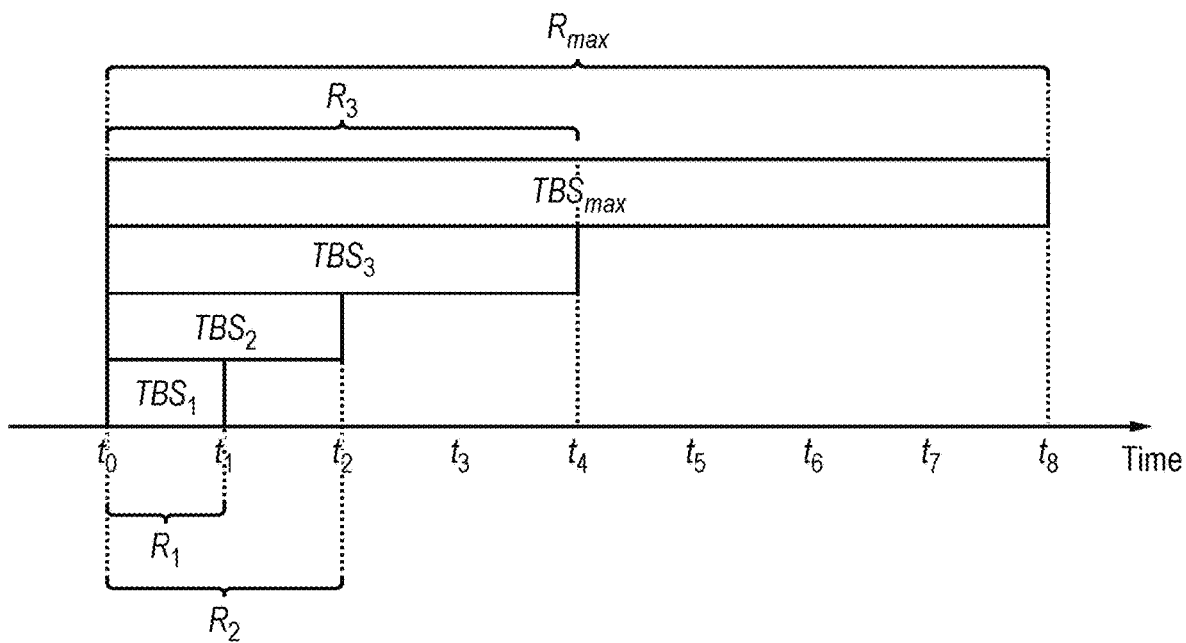
FIG. 4 illustrates the timing of Early Data Transmission (EDT) transmissions of different transport block sizes (TBS)

FIG. 4 shows the sets of subframes in which the EDT is transmitted (as a function of TBS). Irrespective of the transport block size, the starting subframe of the EDT transmission is the same. A physical uplink shared channel (PUSCH) transmitted using any of the transport block sizes $TBS_{max}$, $TBS_3$, $TBS_2$ or $TBS_1$ (transmitted in accordance with the associated repetition level $R_{max}$, $R_3$, $R_2$ or $R_1$) will start at time $t_0$ as shown in FIG. 4, and will end at different times. For two or more UEs each using the same PRACH preamble however, there would be unavoidable collisions between their respective transmitted PUSCHs to the eNodeB, even if different TBS were used by each of the UEs. Embodiments of the present technique seek to solve this problem by defining the transmission of a scaled PUSCH repetition for EDT over Message 3.

Transmission of Scaled PUSCH Repetition in RACH Message 3 EDT

Figure 5:
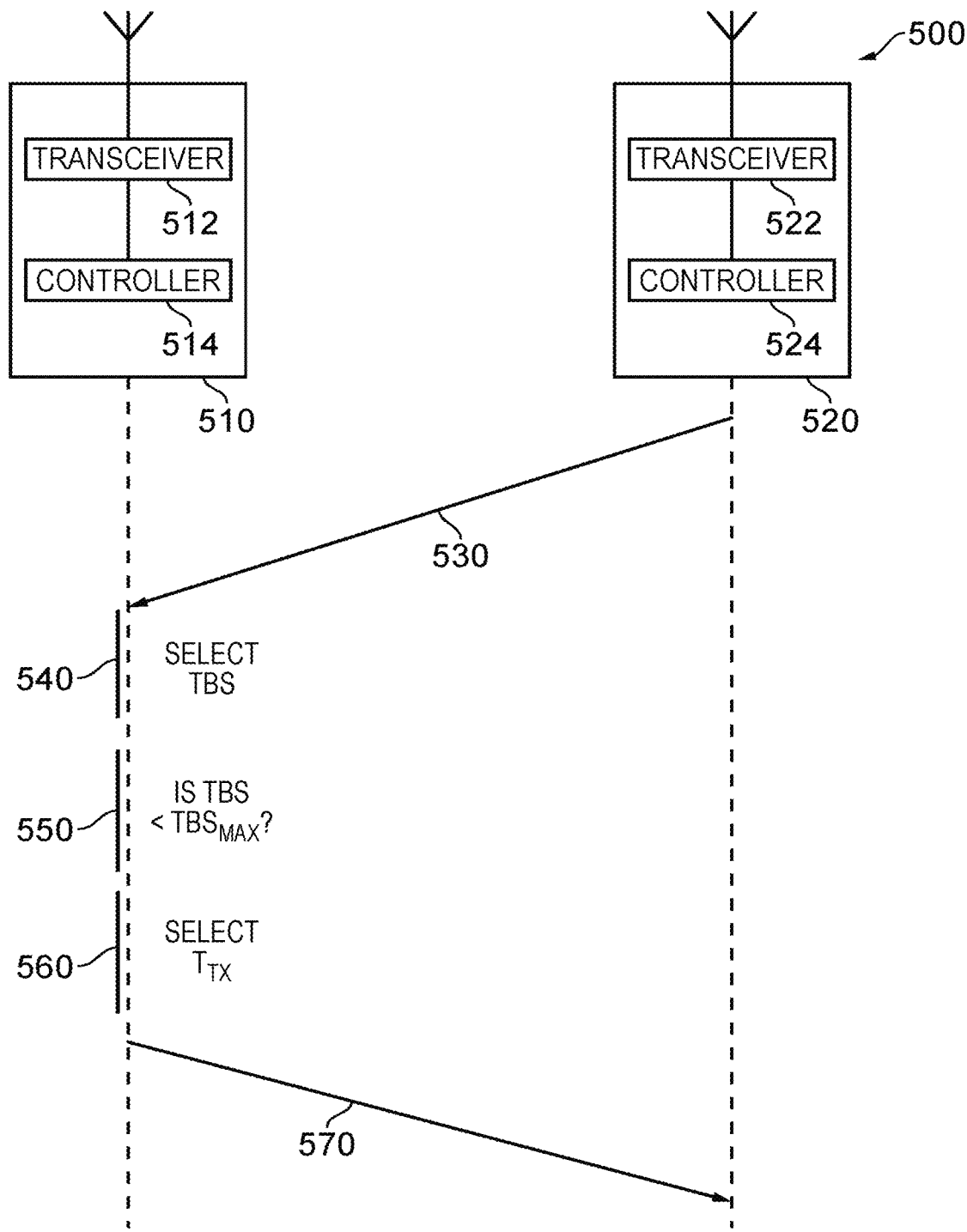
FIG. 5 shows a part schematic, part message flow diagram of communications in a wireless communications system in accordance with embodiments of the present technique.

FIG. 5 schematically shows a wireless communications system 500 according to an embodiment of the present disclosure. The wireless communications system 500 in this example may be based broadly around an LTE-type or an NR-type architecture. As such many aspects of the operation of the wireless communications system/network 500 are known and understood and are not described here in detail in the interest of brevity. Operational aspects of the wireless communications system 500 which are not specifically described herein may be implemented in accordance with any known techniques, for example according to the current LTE standards or NR standards.

The wireless communications system 500 comprises a communications device 510 and infrastructure equipment 520. The communications device 510 comprises transceiver circuitry 512 (which may also be referred to as a transceiver/transceiver unit) for transmission and reception of wireless signals and processor circuitry 514 (which may also be referred to as a processor/processor unit or a controller/controller circuitry/controller unit) configured to control the communications device 510. The processor circuitry 514 may comprise various sub-units/sub-circuits for providing desired functionality as explained further herein. These sub-units may be implemented as discrete hardware elements or as appropriately configured functions of the processor circuitry. Thus the processor circuitry 514 may comprise circuitry which is suitably configured/programmed to provide the desired functionality described herein using conventional programming/configuration techniques for equipment in wireless communications systems. The transceiver circuitry 512 and the processor circuitry 514 are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the communications device 510 will in general comprise various other elements associated with its operating functionality, for example a power source, user interface, and so forth, but these are not shown in FIG. 5 in the interests of simplicity.

The eNodeB 520 comprises transceiver circuitry 522 (which may also be referred to as a transceiver/transceiver unit) for transmission and reception of wireless signals and processor circuitry 524 (which may also be referred to as a processor/processor unit or a controller/controller circuitry/controller unit) configured to control the eNodeB 520 to operate in accordance with embodiments of the present disclosure as described herein. The processor circuitry 524 may comprise various sub-units/sub-circuits for providing desired functionality as explained further herein. These sub-units may be implemented as discrete hardware elements or as appropriately configured functions of the processor circuitry. Thus the processor circuitry 524 may comprise circuitry which is suitably configured/programmed to provide the desired functionality described herein using conventional programming/configuration techniques for equipment in wireless communications systems. The transceiver circuitry 522 and the processor circuitry 524 are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the eNodeB 520 will in general comprise various other elements associated with its operating functionality.

As illustrated by FIG. 5, the transceiver circuitry 512 and the controller circuitry 514 of the communications device 510 are configured in combination to receive 530, from the infrastructure equipment, a scheduling message comprising an indication of an allocation of radio resources to be used for a random access procedure message for the random access procedure, to select 540 a transport block size, TBS, from a plurality of permitted TBS values for the transmission of the random access procedure message, each of the plurality of permitted TBS values being associated with a repetition number, the repetition number being a maximum number of times that the random access procedure message can be transmitted in the allocated radio resources for the each of the permitted TBS values, and to determine 550 whether the selected TBS is lower than a maximum TBS of the plurality of permitted TBS values. If it is determined 550 that the selected TBS is lower than the maximum TBS, the transceiver circuitry 512 and the controller circuitry 514 of the communications device 510 are configured in combination to select 560 a starting transmission time for starting the transmission of the random access procedure message from a set of one or more permitted starting transmission times associated with the selected TBS, and to transmit 570 the random access procedure message to the infrastructure equipment in the allocated radio resources using the selected TBS, the repetition number associated with the selected TBS, and the selected starting transmission time. If the selected TBS is equal to the maximum TBS, the controller circuitry 514 of the communications device 510 configures the transceiver circuitry 512 of the communications device 510 to transmit the random access procedure message at a default time relative to the scheduling message 530.

Embodiments of the present technique therefore, in summary, introduce a variable starting PUSCH transmission time when the selected TBS is smaller than maximum TBS and the repetition for the selected TBS is reduced from what is scheduled in the UL grant.

Figure 6:
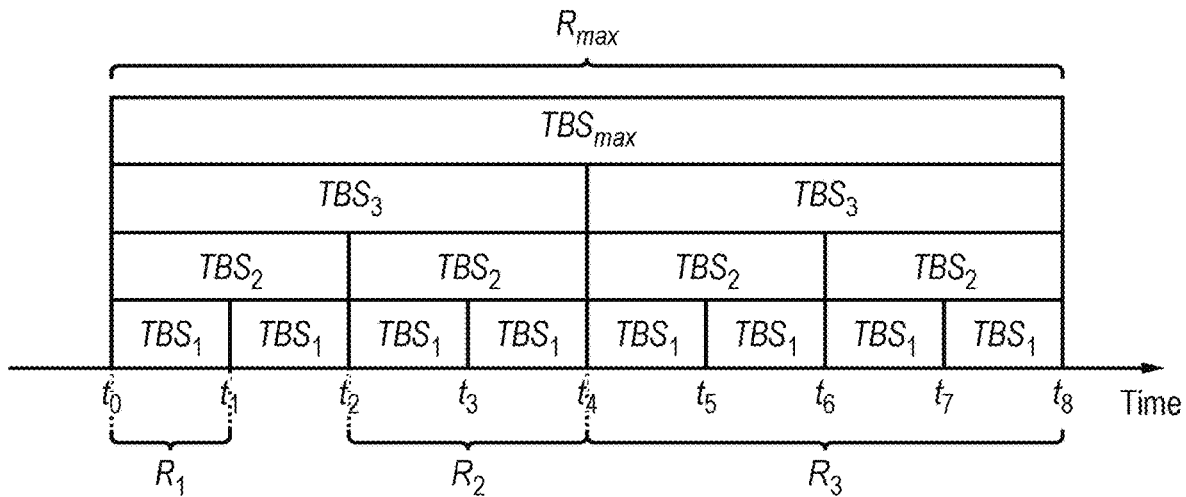
FIG. 6 shows a PUSCH search space having multiple TB candidates for various TBS values each having multiple starting transmission times in accordance with embodiments of the present technique.

In an arrangement of the present technique, each of the (four) TBS values that the UE can select for EDT over Message 3, has one or more predefined start transmission times. For example, the 4 TBS are $\{TBS_1, TBS_2, TBS_3, TBS_{max}\}$ which have repetitions $\{R_1, R_2, R_3, R_{max}\}$ respectively. Here, $TBS_{max}$ is the maximum TBS that is broadcasted by the eNodeB and the remaining 3 TBS values TBS$_1$, TBS$_2$ and TBS$_3$ are obtained from a lookup table in the specifications. The repetition scheduled in the random access response's (RAR's) UL grant is R$_{max}$ and the UE reduces its repetitions to R$_1$, R$_2$ and R$_3$ if it selects TBS$_1$, TBS$_2$ and TBS$_3$ respectively. FIG. 6 shows the possible starting transmission times for each TBS. For example, the possible starting transmission times for each selected TBS are as follows:

TBS$_1$={t$_0$, t$_1$, t$_2$, t$_3$, t$_4$, t$_5$, t$_6$, t$_7$},
TBS$_2$={t$_0$, t$_2$, t$_4$, t$_6$},
TBS$_3$={t$_0$, t$_4$}
TBS$_{max}$={t$_0$}

Figure 7:
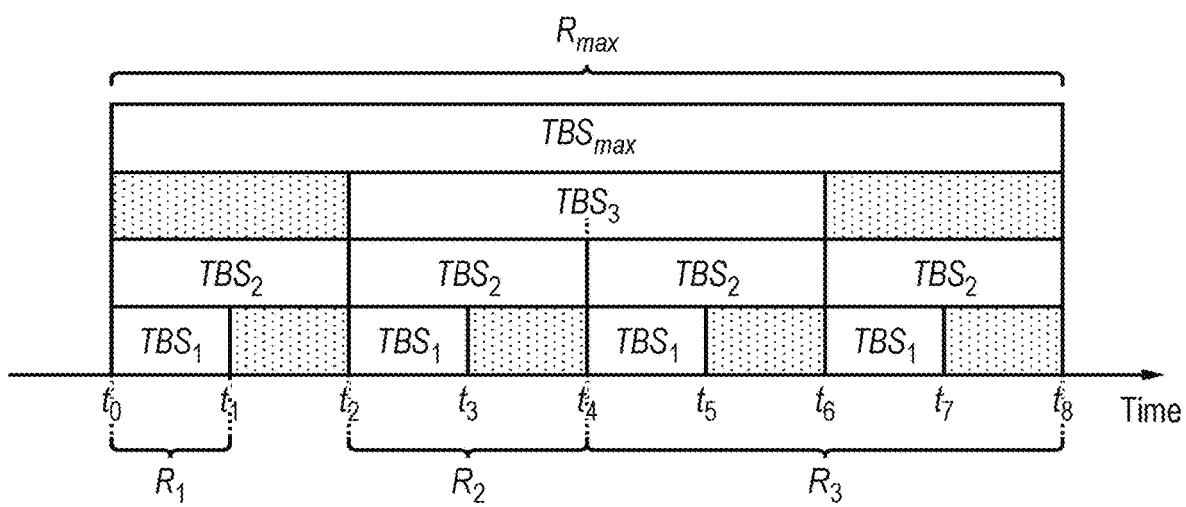
FIG. 7 shows a first example PUSCH search space arrangement in accordance with embodiments of the present technique.

The TBS and different transmission times therefore forms a PUSCH search space at the eNodeB. That is, the eNodeB would blind decode for each possible TBS at each of their corresponding starting times, i.e. the combination of TBS and starting time forms candidates for the eNodeB to blind decode for. It should be appreciated that the search space shown in FIG. 6 is one arrangement of PUSCH search space (i.e. TBS and starting transmission times) and other arrangements are feasible. For example, in FIG. 7, there may be four starting times for TBS$_1$ instead of eight (compared to that in FIG. 6) and one starting time for TBS$_3$, i.e. only one TBS$_3$ candidate instead of two.

Figure 8:
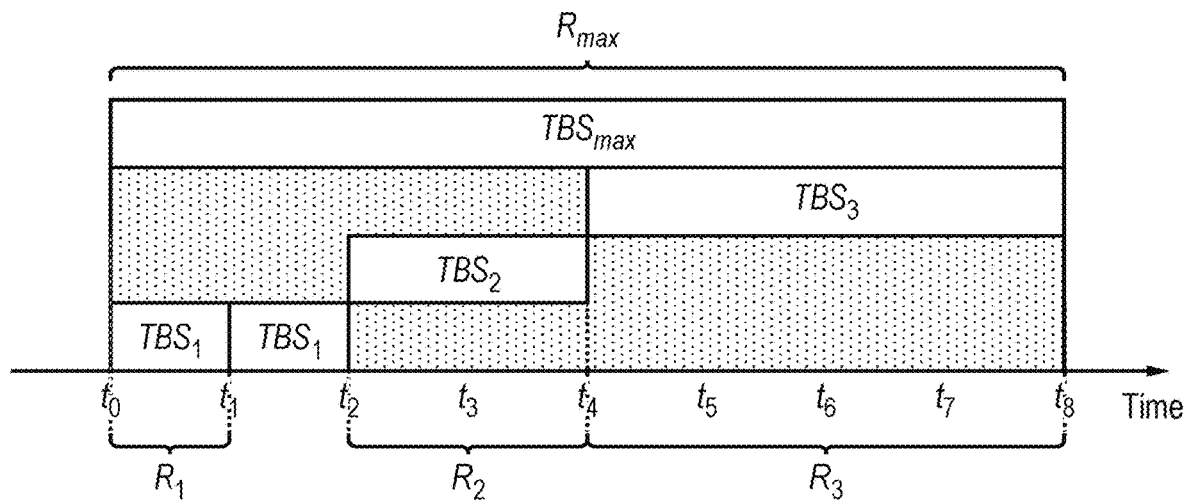
FIG. 8 shows a second example PUSCH search space arrangement in accordance with embodiments of the present technique.

Yet another PUSCH search space arrangement is shown in FIG. 8, where for TBS<TBS$_{max}$, the candidates of different TBS do not collide. It should be appreciated that different PUSCH search space arrangements can be designed depending on the different repetitions for each TBS and the number of starting times for each TBS.

Figure 9:
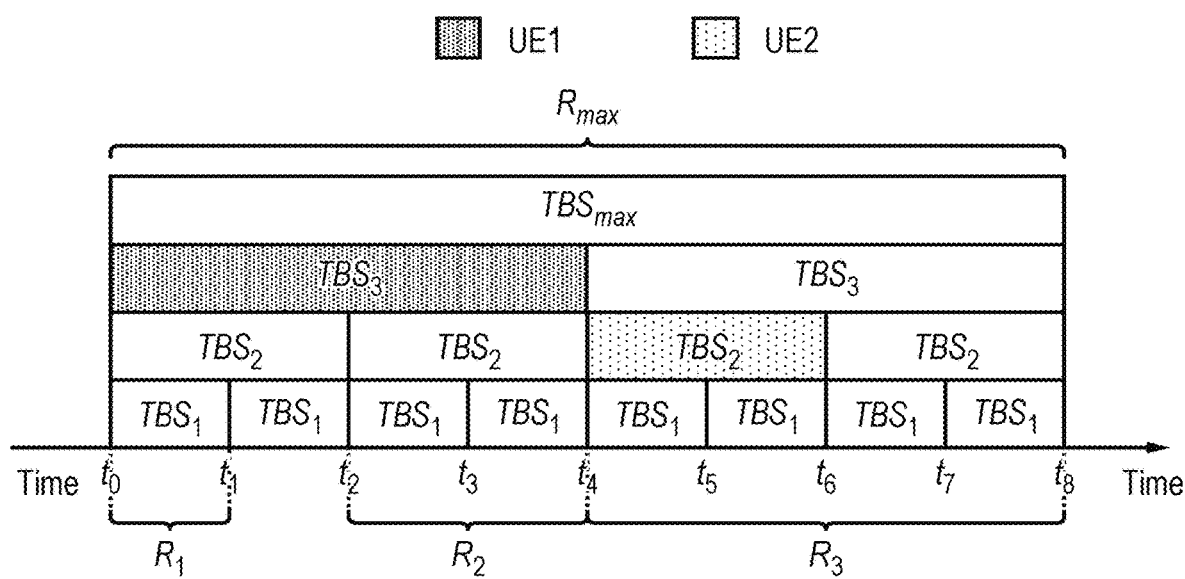
FIG. 9 shows an example of collision avoidance in a RACH message 3 plus EDT transmission from multiple UEs in accordance with embodiments of the present technique

As described previously, contention where two or more UEs use the same PRACH (preamble) can occur during the RACH process. For example if two EDT capable UEs, UE1 and UE2, use the same PRACH preamble, they will both receive the same RAR and UL grant. UE1 and UE2 would then select one of four TBS and transmit their Message 3 & EDT to the eNodeB. Collision of their EDT Message 3s would occur (see FIG. 4: all the EDT message 3 transmissions start at the same time instant) and the eNodeB may not be able to detect any message from either UE1 or UE2 due to interference. However, using the PUSCH search space, UE1 and UE2 can select different transmission times and thereby avoid collision. The example is further explained using FIG. 9, where UE1 and UE2 select TBS$_3$ and TBS$_2$ respectively. In the conventional method, both TBs would be transmitted at the same time (as illustrated by FIG. 4) and the eNodeB may only be able to detect one of the TBs, and/or may require a retransmission from the detected TB. However, instead of transmitting both TBs at the same time UE1 can transmit TBS$_3$ at time t$_0$ and UE2 can transmit TBS$_2$ at time t$_4$ and hence the eNodeB avoids collision and can detect both UE1 and UE2's Message 3 and their EDTs.

In another arrangement of the present technique, the UE selects the transmission time based on its UE ID, such as IMSI or TIMSI. A possible implementation is the UE would perform a MOD function to determine which transmission time T$_{TX}$ it should use, e.g.:

$$T_{TX=TIMSI} \text{ MOD } N_{TX}(TBS_M),$$

where N$_{TX}$ is the number of possible transmission times for TBS$_M$. For example, if the UE selects TBS$_1$, i.e. TBS$_M$=TBS$_1$, then using the PUSCH search space in FIG. 6, N$_{TX}$=8. In other words, the communications device selects the starting transmission time based on an identifier of the communications device. It should be appreciated that other functions of UE ID can be used.

In another arrangement of the present technique, the starting transmission time T$_{TX}$, for a selected TBS is randomly selected by the UE. In other words, the communications device randomly selects the starting transmission time from the set of permitted starting transmission times that are allowed for the selected TBS.

In another arrangement of the present technique, a default starting transmission time is predefined, e.g. in the SIB or specifications. In other words, the communications device selects a default starting transmission time from the set of permitted starting transmission times. The eNodeB will indicate whether the UE can select a different starting transmission time, e.g. using one of the previous arrangements. In other words, the communications device is configured to receive, from the infrastructure equipment, an indication that the communications device is permitted to select any one of the starting transmission times other than the default starting transmission time from the set of permitted starting transmission times, and to select one of the other starting transmission times or the default starting transmission time. This said indication can be semi-static (e.g. RRC configured or broadcast in the SIB) or dynamic, i.e. indicated in the UL grant.

The eNodeB may ask for a retransmission of Message 3+EDT if it fails to receive the PUSCH from the UE. In other words, the communications device is configured to receive, from the infrastructure equipment, an indication that the random access procedure message should be retransmitted. The eNodeB would have to blind detect the TBS the UE selected and hence the eNodeB may not know which TBS to use for the retransmission. However, using the method defined by embodiments of the present technique, the eNodeB has a better knowledge of the TBS selected by the UE based on its starting time. For example, if the eNodeB detects an energy burst only between time t$_3$ and t$_4$, then assuming the PUSCH search space in FIG. 6 is used, the eNodeB would be able to deduce that the UE has selected TBS$_1$ even if it failed to decode the TB. Hence, in the retransmission, the eNodeB can directly schedule resources for a TB with size TBS$_1$ for the UE. In other words, the communications device is configured to receive, from the infrastructure equipment, an allocation of a second set of radio resources to be used for the retransmission of the random access procedure message, the second set of radio resources being allocated by the infrastructure equipment based on the selected TBS for the first transmission of the random access procedure message, and to transmit the random access procedure message to the infrastructure equipment in the second set of radio resources using the selected TBS, the repetition number associated with the selected TBS, and the selected starting transmission time. However, if there is ambiguity as to the selected TBS, the eNodeB would have to provide an UL grant with sufficient resources for the largest TBS, i.e. TBS$_{max}$. The following arrangements of the present technique discussed below are based on this understanding.

In an arrangement of the present technique, the eNodeB indicates (implicitly) that it is unaware of the TBS selected by the UE in the UL grant for retransmission of Message 3+EDT by setting the repetition to R$_{max}$. That is, in the retransmission, if the UL grant for a retransmission of Message 3+EDT schedules the maximum repetition, R$_{max}$, the UE will retransmit its previously selected TBS and use a reduced repetition, i.e. same repetition as that used previously. In other words, the communications device is configured to receive, from the infrastructure equipment, an allocation of a second set of radio resources to be used for the retransmission of the random access procedure message, the second set of radio resources being large enough for the random access procedure message to be transmitted in using the maximum TBS, to receive an indication that the repetition number that should be used for the retransmission of the random access procedure message should be a repetition number associated with the maximum TBS, and to transmit the random access procedure message to the infrastructure equipment in the second set of radio resources using the selected TBS, the repetition number associated with the selected TBS, and the selected starting transmission time. Using the example in FIG. 9, UE1 selects $TBS_3$ with repetition $R_3$. If UE1 receives an UL grant for a retransmission of Message 3+EDT where the repetition is $R_{max}$, the UE will retransmit $TBS_3$ using repetition $R_3$.

In another arrangement of the present technique, if the UL grant schedules a repetition different to $R_{max}$, (e.g. $<R_{max}$) the UE will transmit its previously selected TBS using the scheduled repetition. In other words, the communications device is configured to receive, from the infrastructure equipment, an allocation of a second set of radio resources to be used for the retransmission of the random access procedure message, to receive an indication of a repetition number that should be used for the retransmission of the random access procedure message, and to transmit the random access procedure message to the infrastructure equipment in the second set of radio resources using the selected TBS, the indicated repetition number, and the selected starting transmission time. Optionally, the infrastructure equipment may allocate the second set of radio resource such that they are large enough for the communications device to transmit random access procedure message in using the maximum TBS. Again, using the example of FIG. 9, UE1 selects $TBS_3$ with repetition $R_3$. If UE1 receives an UL grant for a retransmission of Message 3+EDT where the repetition is $R_X$ where $R_X \neq Rmax$, the UE will retransmit its $TBS_3$ using repetition $R_X$. NOTE: $R_X$ may or may not be equal to $R_3$.

Figure 10:
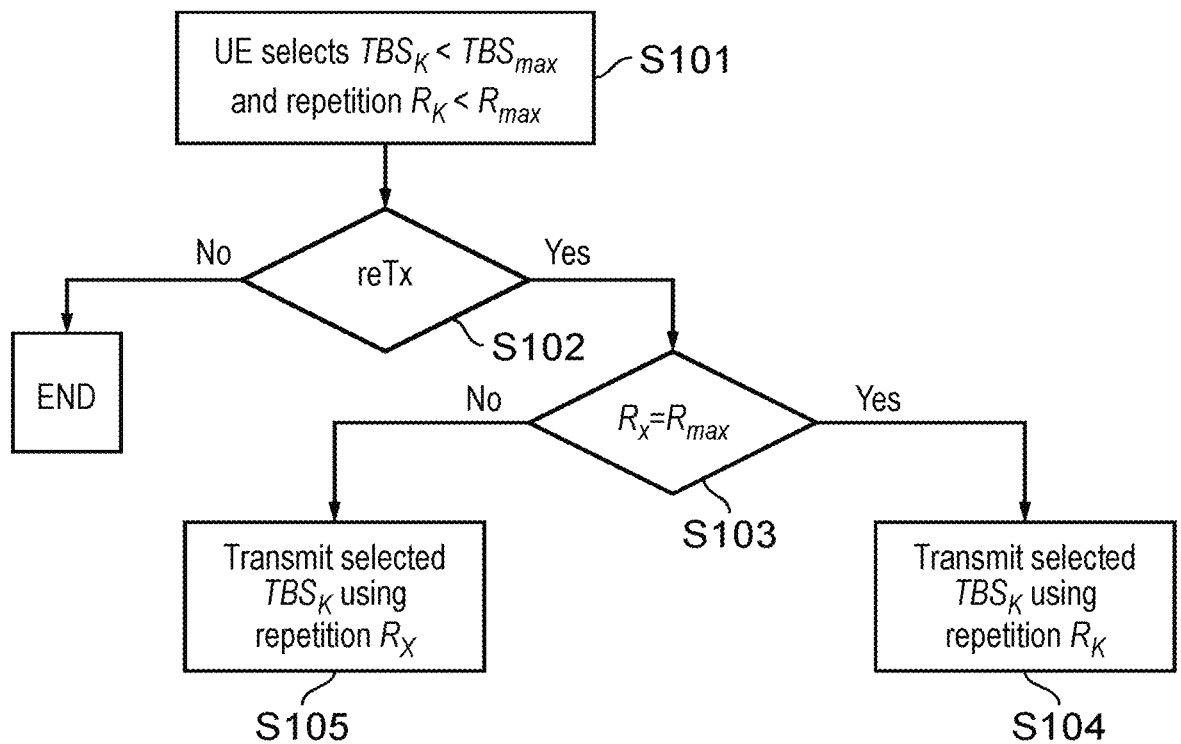
FIG. 10 shows a flow diagram illustrating a process of repetition number selection for retransmission of a RACH message 3 plus EDT transmission in accordance with embodiments of the present technique.

The previous two arrangements are summarized in the flow chart in FIG. 10, where here, as shown in step S101, the UE selects $TBS_K$ which is smaller than the maximum TBS, $TBS_{max}$, and uses the corresponding repetition $R_K$. If there is a retransmission, determined in step S102 through the reception of an indication from the eNodeB, then the UE will check, in step S103, if the scheduled repetition $R_X$, in the UL grant for the retransmission is equal to $R_{max}$. If it is then the UE will retransmit, as shown in step S104, its $TBS_K$ using the previous repetition $R_K$ otherwise it retransmits, as shown in step S105, using the scheduled repetition $R_X$. That is, the eNodeB would indicate implicitly whether it is aware of which TBS the UE selected or not using the repetition field.

In another arrangement of the present technique, if the UL grant for retransmission has $TBS=TBS_{max}$, or if the UL grant indicates that the eNodeB is unsure of the selected TBS and in the initial transmission the UE has selected a TBS lower than $TBS_{max}$, the UE will retransmit its Msg3+EDT using the previous TBS and reuse the previous repetition. In other words, the communications device is configured to receive, from the infrastructure equipment, an allocation of a second set of radio resources to be used for the retransmission of the random access procedure message, to receive an indication that the maximum TBS should be used for the retransmission of the random access procedure message, and to transmit the random access procedure message to the infrastructure equipment in the second set of radio resources using the selected TBS, the repetition number associated with the selected TBS, and the selected starting transmission time.

Alternatively, in a similar arrangement of the present technique, if the UL grant for retransmission has $TBS=TBS_{max}$, or if the UL grant indicates that the eNodeB is unsure of the selected TBS and in the initial transmission the UE has selected a TBS lower than $TBS_{max}$, the UE will retransmit its Msg3+EDT using the previous TBS and will apply the same scaling factor on the repetition indicated in the UL grant. That is to say, the first transmission the scheduled repetition, $R_K$, may be 1000, and in the retransmission this may be scheduled by the eNodeB to be 500. If, in the initial transmission, the UE selected a TBS lower than $TBS_{max}$, and applied a scaling factor of S=0.6 to the repetition number associated with the selected TBS, the scheduled repetition in the first transmission will have been 1000×0.6=600. In the retransmission, the repetition level of 500 is similarly scaled, and it becomes 500×0.6=300. In other words, the communications device is configured to receive, from the infrastructure equipment, an allocation of a second set of radio resources to be used for the retransmission of the random access procedure message, to receive an indication that the maximum TBS should be used for the retransmission of the random access procedure message, to receive an indication of a repetition number that should be used for the retransmission of the random access procedure message, to apply a scaling factor to the indicated repetition number to generate a scaled repetition number, the scaling factor having been applied to the repetition number associated with the selected TBS for the initial transmission of the random access procedure message and to transmit the random access procedure message to the infrastructure equipment in the second set of radio resources using the selected TBS, the scaled repetition number, and the selected starting transmission time. It should be appreciated by those skilled in the art that the scaling factor, as described in relation to this arrangement of the present technique, may be used in combination with any other arrangements described in the present disclosure.

In another arrangement of the present technique, if the UL grant for retransmission has TBS=UE selected TBS, then the UE will retransmit its Msg3+EDT using the repetition indicated in this UL grant. In other words, the communications device is configured to receive, from the infrastructure equipment, an allocation of a second set of radio resources to be used for the retransmission of the random access procedure message, to receive an indication of a repetition number that should be used for the retransmission of the random access procedure message, to receive an indication that the selected TBS should be used for the retransmission of the random access procedure message, and to transmit the random access procedure message to the infrastructure equipment in the second set of radio resources using the selected TBS, the indicated repetition number (i.e. the repetition number associated with the selected TBS), and the selected starting transmission time. Optionally, the infrastructure equipment may allocate the second set of radio resource such that they are large enough for the communications device to transmit random access procedure message in using the selected TBS.

Figure 11:
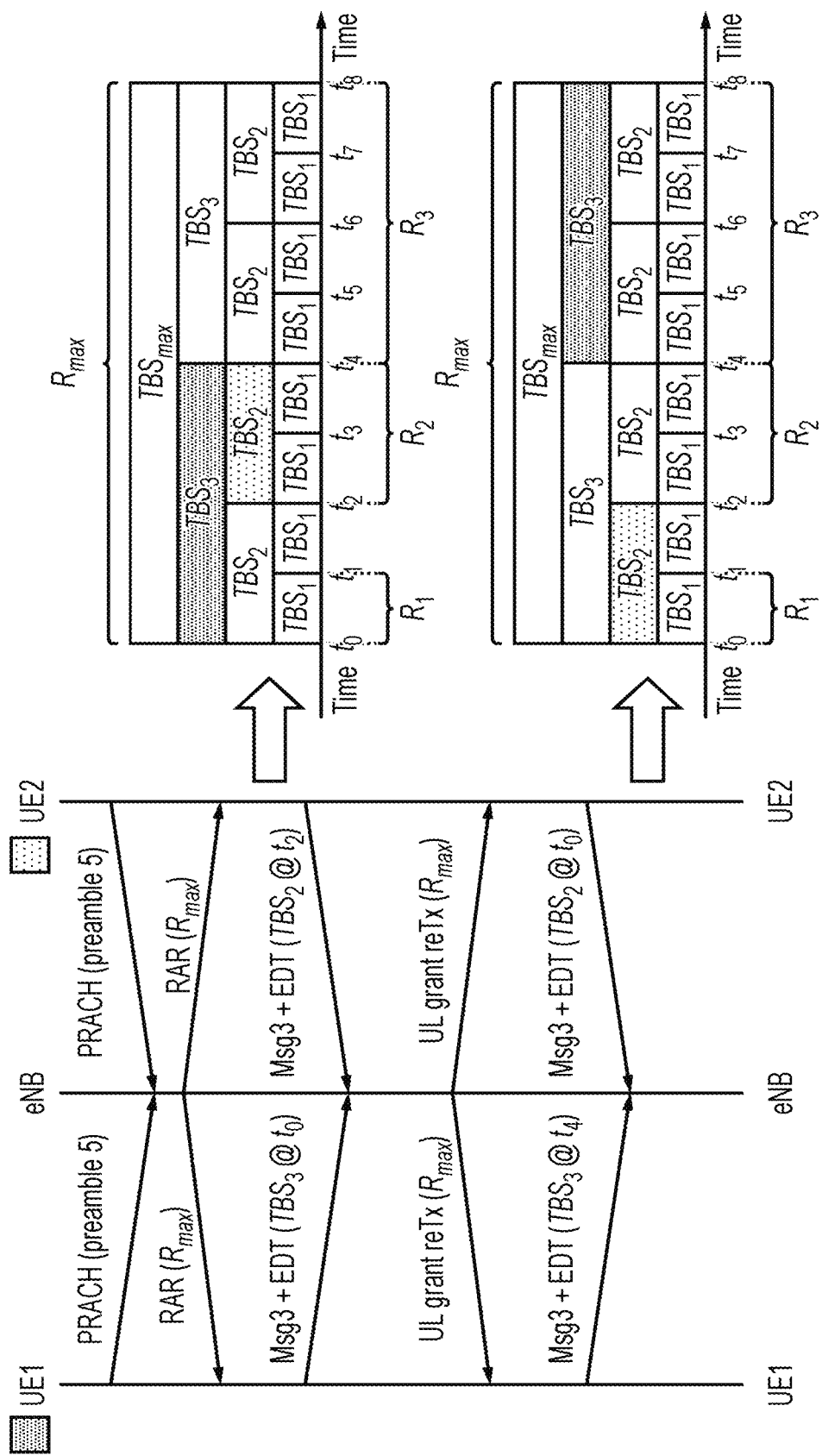
FIG. 11 shows a first example message flow diagram exchange between an eNodeB and two UEs in which a starting transmission time for retransmission of a RACH message 3 plus EDT transmission is changed in accordance with embodiments of the present technique.

In another arrangement of the present technique, if the eNodeB indicates that it still unsure of the UE selected TBS as per the previously described arrangement (e.g. with scheduled repetition=$R_{max}$ or scheduled $TBS=TBS_{max}$), the UE will retransmit its selected TBS using a starting time that is different to its previous transmission. This is to avoid the contentious UEs from consistently colliding. In other words, the communications device is configured to receive, from the infrastructure equipment, an allocation of a second set of radio resources to be used for the retransmission of the random access procedure message, to receive, from the infrastructure equipment, an indication that the communications should retransmit the random access procedure message using a different starting transmission time from the selected starting transmission time, and to transmit the random access procedure message to the infrastructure equipment in the second set of radio resources using the selected TBS, the repetition number associated with the selected TBS, and a starting transmission time from the set of permitted starting transmission times associated with the selected TBS other than the (previously) selected starting transmission time (i.e. the starting transmission time selected for the initial/first transmission which the eNodeB requests is retransmitted). An example is shown in FIG. 11, where two UEs, UE1 and UE2, select the same preamble, i.e. Preamble 5 when transmitting their PRACH thereby causing contention. The eNodeB responds with RAR providing an UL grant with repetition set to $R_{max}$ (i.e. repetition for the maximum TBS, $TBS_{max}$). UE1 selects $TBS_3$ and UE2 selects $TBS_2$ for their Message 3+EDT PUSCH transmissions. Using one of the previous arrangements, UE1 selects time $t_0$ for its $TBS_3$ transmission whilst UE2 selects time $t_2$ for its $TBS_2$ transmission. These selections cause collision at the eNodeB and here the eNodeB is unable to distinguish whether $TBS_2$ or $TBS_3$ has been transmitted and therefore transmits another UL grant for the retransmission of Msg3+EDT and sets the repetition to $R_{max}$ (or TBS to $TBS_{max}$). As per this arrangement, the UEs would perform their retransmission but use a different starting transmission time, here UE1 selects $t_4$ and UE2 selects $t_0$ thereby avoiding further collision.

Figure 12:
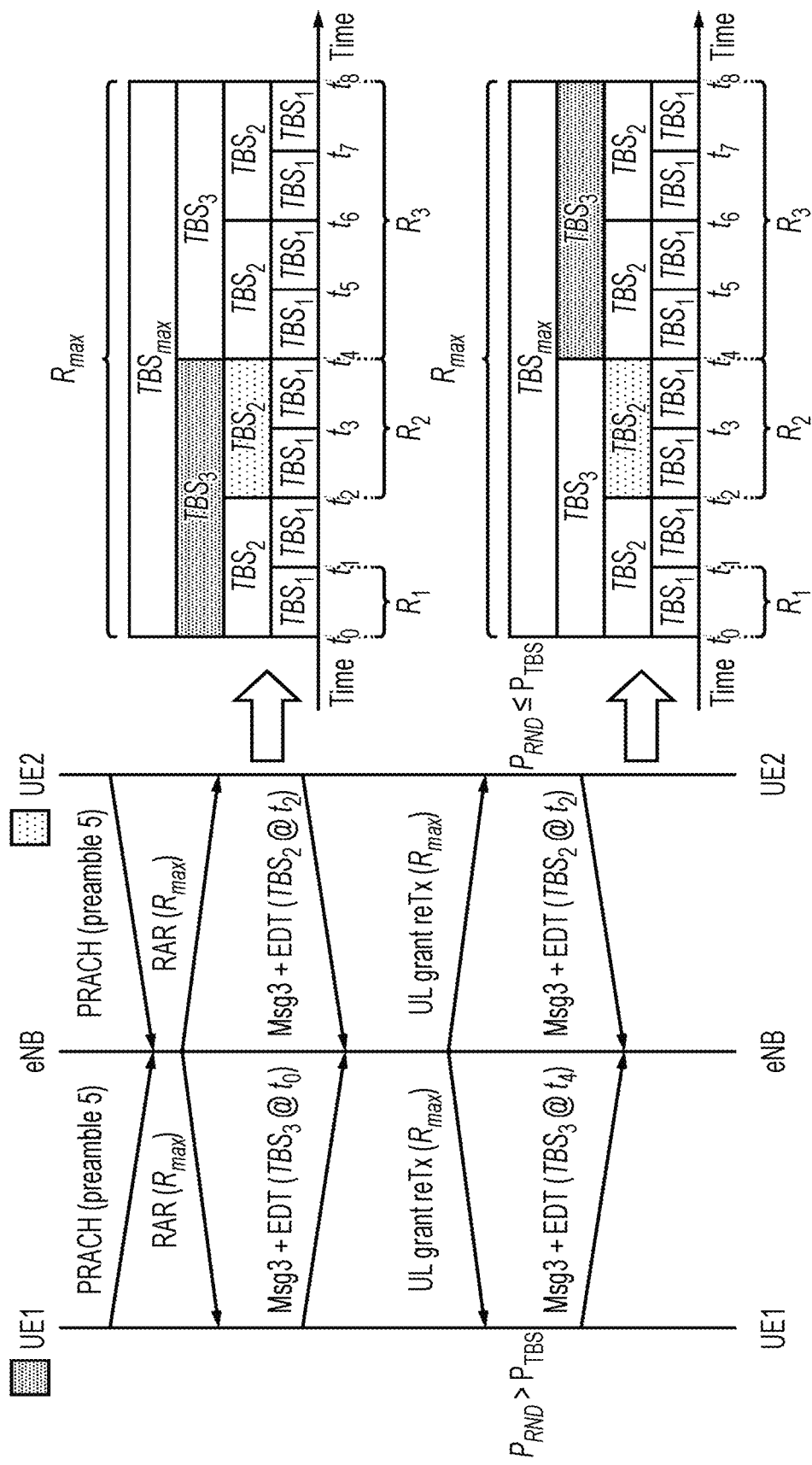
FIG. 12 shows a second example message flow diagram exchange between an eNodeB and two UEs in which a starting transmission time for retransmission of a RACH message 3 plus EDT transmission is changed based on a comparison with a probability threshold in accordance with embodiments of the present technique.

In another arrangement of the present technique, for a retransmission of Message 3+EDT, if the UE selected a $TBS<TBS_{max}$, then the UE uses a probability of $P_{TBS}$ to determine whether it should retransmit using the previous starting transmission time or use a different starting transmission time. In other words, the communications device is configured to receive, from the infrastructure equipment, an allocation of a second set of radio resources to be used for the retransmission of the random access procedure message, to generate a random number, to compare the random number with a probability threshold, and to transmit, the random access procedure message to the infrastructure equipment in the second set of radio resources using the selected TBS, the repetition number associated with the selected TBS, and, dependent on the comparison, a starting transmission time from the set of permitted starting transmission times associated with the selected TBS other than the (previously) selected starting transmission time. If, however, the comparison between the random number and the probability threshold does not mean that the communications device should retransmit the random access procedure message using the other (changed) starting transmission time, the communications device will again use the (previously) selected starting transmission time. It can be observed in the example in FIG. 11 that only one of the UEs needs to change its transmission time to avoid collision and it is possible that if both UEs change their transmission time they may still collide. An example of this arrangement is shown in FIG. 12, here UE1 and UE2 use the same preamble causing contention and similar to the example in FIG. 11, UE1 transmits $TBS_3$ at time $t_0$ and UE2 transmits $TBS_2$ at time $t_2$ thereby causing collision at the eNodeB. The UL grant for the retransmission has a repetition of $R_{max}$ thereby indicating that the UEs will retransmit their selected TBS using the previous numbers of repetitions. Here, each UE would evaluate the probability $P_{TBS}$, e.g. by selecting a random number $P_{RND}$, between 0 and 1, and if the number is greater than Pres, it will change its starting transmission time otherwise it will use the starting transmission time in its previous transmission. In this example, UE1 evaluated that its random number $P_{RND}>P_{TBS}$ and so it changes its starting transmission time to $t_4$. UE2 has a $P_{RND}\leq P_{TBS}$ and so it does not change its starting transmission time and retransmits at time $t_2$. Here both UEs avoid collision in the retransmission. It can be observed that if $P_{TBS}=0$, it means the UE will always change its starting transmission time and if $P_{TBS}=1$, the UE will never change its starting transmission time.

In an arrangement of the present technique, the value $P_{TBS}$ is static or semi-static, i.e. can be UE-specifically configured, broadcast in the SIB or specified in the specifications. In other words, the probability threshold is predetermined and known to the communications device.

In another arrangement of the present technique, the value $P_{TBS}$ is indicated in the UL grant and therefore is dynamic. In other words, the probability threshold is indicated to the communications device by the infrastructure equipment along with the allocation of the second set of radio resources. The probability value may be varied for different UEs, or may be related to the TBS selected by the UE. For example, in the example of FIG. 12, if it were UE2 that changed its starting time, it may change to the candidate starting at time $t_0$, and there would therefore still be a collision. However, if it were UE1 that changed its starting time, it would only be able to change to the candidate starting at time $t_4$, as is indeed shown in FIG. 12, thus avoiding the collision.

In another arrangement of the present technique, the eNodeB indicates in the UL grant whether the UE should change to a different starting time or not. This can be indicated using an unused Resource Allocation, MCS and/or TBS state in the DCI. In other words, the communications device is configured to receive, from the infrastructure equipment, an indication that the communications should retransmit the random access procedure message using a different starting transmission time from the selected starting transmission time.

Flow Chart Representation

Figure 13:
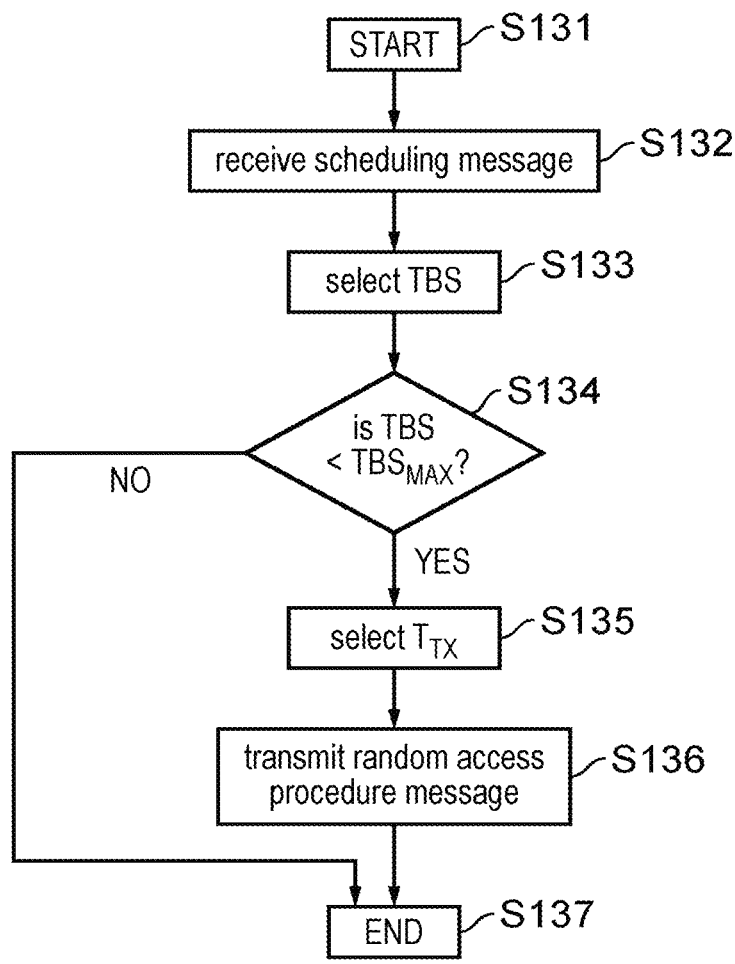
FIG. 13 shows a flow diagram illustrating a process of communication in a communications system in accordance with embodiments of the present technique.

FIG. 13 shows a flow diagram illustrating a process of communications in a communications system in accordance with embodiments of the present technique. The process shown by FIG. 13 is a method of operating a communications device in a wireless communications system that supports a random access procedure.

The method begins in step S131. The method comprises, in step S132, receiving, from an infrastructure equipment of the wireless communications system, a scheduling message comprising an indication of an allocation of radio resources to be used for a random access procedure message for the random access procedure. The process proceeds to step S133, which comprises selecting a transport block size, TBS, from a plurality of permitted TBS values for the transmission of the random access procedure message, each of the plurality of permitted TBS values being associated with a repetition number, the repetition number being a maximum number of times that the random access procedure message can be transmitted in the allocated radio resources for the each of the permitted TBS values. The process then proceeds to step S134, which comprises determining whether the selected TBS is lower than a maximum TBS of the plurality of permitted TBS values. If it is determined in step S134 that the selected TBS is lower than a maximum TBS of the plurality of permitted TBS values, the method comprises in step S135 selecting a starting transmission time for starting the transmission of the random access procedure message from a plurality of permitted starting transmission times associated with the selected TBS and, in step S136, transmitting the random access procedure message to the infrastructure equipment in the allocated communications resources using the selected TBS, the repetition number associated with the selected TBS, and the selected starting transmission time. The process ends in step S137. If, alternatively, it is determined in step S134 that the selected TBS is equal to the maximum TBS, the method moves to step S137, where it ends. The skilled person would understand that, in this case, the communications device would simply transmit the random access procedure message to the infrastructure equipment using $TBS_{max}$ at time $t_0$ (i.e. there is no explicit selection of starting transmission time) as shown in any of FIG. 4 or 6 to 9.

Those skilled in the art would appreciate that the method shown by FIG. 13 may be adapted in accordance with embodiments of the present technique. For example, other intermediate steps may be included in the method, or the steps may be performed in any logical order.

Those skilled in the art would also appreciate that such infrastructure equipment and/or wireless communications networks as herein defined may be further defined in accordance with the various arrangements and embodiments discussed in the preceding paragraphs. For example, though four TBS and repetition levels are shown in the drawings and described above, those skilled in the art would appreciate that this number may be variable, and the respective sizes of each of these may be different from what is shown and described. It would be further appreciated by those skilled in the art that such infrastructure equipment and wireless communications networks as herein defined and described may form part of communications systems other than those defined by the present invention.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored on a SIM card. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

The following numbered paragraphs provide further example aspects and features of the present technique:

Paragraph 1. A method of operating a communications device in a wireless communications system that supports a random access procedure, the method comprising:
  receiving, from an infrastructure equipment of the wireless communications system, a scheduling message comprising an indication of an allocation of radio resources to be used for a random access procedure message for the random access procedure;
  selecting a transport block size, TBS, from a plurality of permitted TBS values for the transmission of the random access procedure message, each of the plurality of permitted TBS values being associated with a repetition number, the repetition number being a maximum number of times that the random access procedure message can be transmitted in the allocated radio resources for the each of the permitted TBS values;
  determining whether the selected TBS is lower than a maximum TBS of the plurality of permitted TBS values; and, if it is determined that the selected TBS is lower than the maximum TBS,
  selecting a starting transmission time for starting the transmission of the random access procedure message from a set of one or more permitted starting transmission times associated with the selected TBS; and
  transmitting the random access procedure message to the infrastructure equipment in the allocated radio resources using the selected TBS, the repetition number associated with the selected TBS, and the selected starting transmission time.

Paragraph 2. A method according to Paragraph 1, wherein the communications device selects the starting transmission time based on an identifier of the communications device.

Paragraph 3. A method according to Paragraph 1 or Paragraph 2, wherein the communications device randomly selects the starting transmission time.

Paragraph 4. A method according to any of Paragraphs 1 to 3, wherein the communications device selects a default starting transmission time from the set of permitted starting transmission times.

Paragraph 5. A method according to Paragraph 4, comprising:
  receiving, from the infrastructure equipment, an indication that the communications device is permitted to select the default starting transmission time or any one of the starting transmission times other than the default starting transmission time from the set of permitted starting transmission times; and selecting one of the other starting transmission times or the default starting transmission time.

Paragraph 6. A method according to any of Paragraphs 1 to 5, comprising receiving, from the infrastructure equipment, an indication that the random access procedure message should be retransmitted.

Paragraph 7. A method according to Paragraph 6, comprising:

receiving, from the infrastructure equipment, an allocation of a second set of radio resources to be used for the retransmission of the random access procedure message, the second set of radio resources being allocated by the infrastructure equipment based on the selected TBS for the first transmission of the random access procedure message; and transmitting the random access procedure message to the infrastructure equipment in the second set of radio resources using the selected TBS, the repetition number associated with the selected TBS, and the selected starting transmission time.

Paragraph 8. A method according to Paragraph 6 or Paragraph 7, comprising:

receiving, from the infrastructure equipment, an allocation of a second set of radio resources to be used for the retransmission of the random access procedure message, the second set of radio resources being large enough for the random access procedure message to be transmitted in using the maximum TBS;

receiving an indication that the repetition number that should be used for the retransmission of the random access procedure message should be a repetition number associated with the maximum TBS; and transmitting the random access procedure message to the infrastructure equipment in the second set of radio resources using the selected TBS, the repetition number associated with the selected TBS, and the selected starting transmission time.

Paragraph 9. A method according to any of Paragraphs 6 to 8, comprising:

receiving, from the infrastructure equipment, an allocation of a second set of radio resources to be used for the retransmission of the random access procedure message, the second set of radio resources being large enough for the random access procedure message to be transmitted in using the maximum TBS;

receiving an indication of a repetition number that should be used for the retransmission of the random access procedure message; and transmitting the random access procedure message to the infrastructure equipment in the second set of radio resources using the selected TBS, the indicated repetition number, and the selected starting transmission time.

Paragraph 10. A method according to any of Paragraphs 6 to 9, comprising:

receiving, from the infrastructure equipment, an allocation of a second set of radio resources to be used for the retransmission of the random access procedure message, the second set of radio resources being large enough for the random access procedure message to be transmitted in using the selected TBS;

receiving an indication of a repetition number that should be used for the retransmission of the random access procedure message; and transmitting the random access procedure message to the infrastructure equipment in the second set of radio resources using the selected TBS, the indicated repetition number, and the selected starting transmission time.

Paragraph 11. A method according to any of Paragraphs 6 to 10, comprising:

receiving, from the infrastructure equipment, an allocation of a second set of radio resources to be used for the retransmission of the random access procedure message;

receiving an indication that the maximum TBS should be used for the retransmission of the random access procedure message; and transmitting the random access procedure message to the infrastructure equipment in the second set of radio resources using the selected TBS, the repetition number associated with the selected TBS, and the selected starting transmission time.

Paragraph 12. A method according to any of Paragraphs 6 to 11, comprising:

receiving, from the infrastructure equipment, an allocation of a second set of radio resources to be used for the retransmission of the random access procedure message;

receiving an indication that the maximum TBS should be used for the retransmission of the random access procedure message;

receiving an indication of a repetition number that should be used for the retransmission of the random access procedure message;

applying a scaling factor to the indicated repetition number to generate a scaled repetition number, the scaling factor having been applied to the repetition number associated with the selected TBS for the initial transmission of the random access procedure message; and transmitting the random access procedure message to the infrastructure equipment in the second set of radio resources using the selected TBS, the scaled repetition number, and the selected starting transmission time.

Paragraph 13. A method according to any of Paragraphs 6 to 12, comprising:

receiving, from the infrastructure equipment, an allocation of a second set of radio resources to be used for the retransmission of the random access procedure message;

receiving an indication that the selected TBS should be used for the retransmission of the random access procedure message; and transmitting the random access procedure message to the infrastructure equipment in the second set of radio resources using the selected TBS, the repetition number associated with the selected TBS, and the selected starting transmission time.

Paragraph 14. A method according to any of Paragraphs 6 to 13, comprising:

receiving, from the infrastructure equipment, an allocation of a second set of radio resources to be used for the retransmission of the random access procedure message;

receiving, from the infrastructure equipment, an indication that the communications should retransmit the random access procedure message using a different starting transmission time from the selected starting transmission time; and transmitting the random access procedure message to the infrastructure equipment in the second set of radio resources using the selected TBS, the repetition number associated with the selected TBS, and a starting transmission time from the set of permitted starting transmission times associated with the selected TBS other than the selected starting transmission time for the first transmission of the random access procedure message.

Paragraph 15. A method according to any of Paragraphs 6 to 14, comprising:
receiving, from the infrastructure equipment, an allocation of a second set of radio resources to be used for the retransmission of the random access procedure message;
generating a random number;
comparing the random number with a probability threshold; and
transmitting the random access procedure message to the infrastructure equipment in the second set of radio resources using the selected TBS, the repetition number associated with the selected TBS, and, dependent on the comparison, a starting transmission time from the set of permitted starting transmission times associated with the selected TBS other than the selected starting transmission time.

Paragraph 16. A method according to Paragraph 15, wherein the probability threshold is predetermined and known to the communications device.

Paragraph 17. A method according to Paragraph 15 or Paragraph 16, wherein the probability threshold is indicated to the communications device by the infrastructure equipment along with the allocation of the second set of radio resources.

Paragraph 18. A communications device forming part of a wireless communications system that supports a first random access procedure, the wireless communications system comprising an infrastructure equipment and the communications device, wherein the communications device comprises transceiver circuitry and controller circuitry which are configured in combination:
to receive, from the infrastructure equipment, a scheduling message comprising an indication of an allocation of radio resources to be used for a random access procedure message for the random access procedure;
to select a transport block size, TBS, from a plurality of permitted TBS values for the transmission of the random access procedure message, each of the plurality of permitted TBS values being associated with a repetition number, the repetition number being a maximum number of times that the random access procedure message can be transmitted in the allocated radio resources for the each of the permitted TBS values;
to determine whether the selected TBS is lower than a maximum TBS of the plurality of permitted TBS values; and, if it is determined that the selected TBS is lower than the maximum TBS,
to select a starting transmission time for starting the transmission of the random access procedure message from a set of one or more permitted starting transmission times associated with the selected TBS; and
to transmit the random access procedure message to the infrastructure equipment in the allocated radio resources using the selected TBS, the repetition number associated with the selected TBS, and the selected starting transmission time.

Paragraph 19. Circuitry for a communications device forming part of a wireless communications system that supports a first random access procedure, the wireless communications system comprising an infrastructure equipment and the communications device, wherein the communications device comprises transceiver circuitry and controller circuitry which are configured in combination:
to receive, from the infrastructure equipment, a scheduling message comprising an indication of an allocation of radio resources to be used for a random access procedure message for the random access procedure;
to select a transport block size, TBS, from a plurality of permitted TBS values for the transmission of the random access procedure message, each of the plurality of permitted TBS values being associated with a repetition number, the repetition number being a maximum number of times that the random access procedure message can be transmitted in the allocated radio resources for the each of the permitted TBS values;
to determine whether the selected TBS is lower than a maximum TBS of the plurality of permitted TBS values; and, if it is determined that the selected TBS is lower than the maximum TBS,
to select a starting transmission time for starting the transmission of the random access procedure message from a set of one or more permitted starting transmission times associated with the selected TBS; and
to transmit the random access procedure message to the infrastructure equipment in the allocated radio resources using the selected TBS, the repetition number associated with the selected TBS, and the selected starting transmission time.

Paragraph 20. A method of operating an infrastructure equipment forming part of a wireless communications system to support a random access procedure, the method comprising:
transmitting, to at least one communications device, a scheduling message comprising an indication of an allocation of radio resources to be used for a random access procedure message for the random access procedure; and
receiving the random access procedure message from the at least one communications device in the allocated radio resources using a transport block size, TBS, selected by the communications device from a plurality of permitted TBS values for the transmission of the random access procedure message, a repetition number associated with the selected TBS, and a starting transmission time for starting the transmission of the random access procedure selected by the communications device from a set of one or more permitted starting transmission times associated with the selected TBS, wherein the repetition number is a maximum number of times that the random access procedure message can be transmitted in the allocated radio resources for the each of the permitted TBS values, and wherein the TBS is lower than a maximum TBS of the plurality of TBS values.

Paragraph 21. An infrastructure equipment forming part of a wireless communications system to support a first random access procedure, wherein the infrastructure equipment comprises transceiver circuitry and controller circuitry which are configured in combination:
to transmit, to at least one communications device, a scheduling message comprising an indication of an allocation of radio resources to be used for a random access procedure message for the random access procedure; and
to receive the random access procedure message from the at least one communications device in the allocated radio resources using a transport block size, TBS, selected by the communications device from a plurality of permitted TBS values for the transmission of the random access procedure message, a repetition number associated with the selected TBS, and a starting transmission time for starting the transmission of the random access procedure selected by the communications device from a set of one or more permitted starting transmission times associated with the selected TBS, wherein the repetition number is a maximum number of times that the random access procedure message can be transmitted in the allocated radio resources for the each of the permitted TBS values, and wherein the TBS is lower than a maximum TBS of the plurality of TBS values.

Paragraph 22. Circuitry for an infrastructure equipment forming part of a wireless communications system to support a first random access procedure, wherein the infrastructure equipment comprises transceiver circuitry and controller circuitry which are configured in combination:

to transmit, to at least one communications device, a scheduling message comprising an indication of an allocation of radio resources to be used for a random access procedure message for the random access procedure; and to receive the random access procedure message from the at least one communications device in the allocated radio resources using a transport block size, TBS, selected by the communications device from a plurality of permitted TBS values for the transmission of the random access procedure message, a repetition number associated with the selected TBS, and a starting transmission time for starting the transmission of the random access procedure selected by the communications device from a set of one or more permitted starting transmission times associated with the selected TBS, wherein the repetition number is a maximum number of times that the random access procedure message can be transmitted in the allocated radio resources for the each of the permitted TBS values, and wherein the TBS is lower than a maximum TBS of the plurality of TBS values.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] "Telecommunications Apparatus and Methods," Sony Corporation, European Patent Application No. EP18166211.5.

What is claimed is:

1. Circuitry for a communications device, the circuitry comprising:

transceiver circuitry; and controller circuitry configured in combination with the transceiver circuitry to:

receive, from infrastructure equipment in a wireless communications system, a scheduling message comprising an indication of an allocation of radio resources to be used for a random access procedure message for a random access procedure supported by the wireless communications system;

select a transport block size (TBS) from a plurality of permitted TBS values for transmission of the random access procedure message, wherein each permitted TBS value of the plurality of permitted TBS values is associated with a repetition number, the repetition number being a maximum number of times that the random access procedure message can be transmitted in the allocated radio resources for the each permitted TBS value of the plurality of permitted TBS values;

determine whether the selected TBS is lower than a maximum TBS of the plurality of permitted TBS values; and in a case that the selected TBS is determined to be lower than the maximum TBS:

select, based on an identifier of the communications device, a starting transmission time for starting transmission of the random access procedure message from a set of one or more permitted starting transmission times associated with the selected TBS; and transmit the random access procedure message to the infrastructure equipment in the allocated radio resources using the selected TBS at the selected starting transmission time.

2. The circuitry according to claim 1, wherein the controller circuitry selects the starting transmission time by randomly selecting the starting transmission time from the set of one or more permitted starting transmission times.

3. The circuitry according to claim 1, wherein the controller circuitry selects the starting transmission time by selecting a default starting transmission time from the set of one or more permitted starting transmission times.

4. The circuitry according to claim 3, wherein the controller circuitry is further configured in combination with the transceiver circuitry circuitry to:
receive, from the infrastructure equipment, an indication that the communications device is permitted to select the default starting transmission time or any one of the starting transmission times other than the default starting transmission time from the set of one or more permitted starting transmission times; and
select the default starting transmission time or any one of the starting transmission times other than the default starting transmission time.

5. The circuitry according to claim 1, wherein the controller circuitry is further configured in combination with the transceiver circuitry to receive, from the infrastructure equipment, an indication that the random access procedure message should be retransmitted.

6. The circuitry according to claim 5, wherein the controller circuitry is further configured in combination with the transceiver circuitry to:
receive, from the infrastructure equipment, an allocation of a set of radio resources to be used for retransmission of the random access procedure message, the set of radio resources being allocated by the infrastructure equipment based on the selected TBS for the transmission of the random access procedure message; and
retransmit the random access procedure message to the infrastructure equipment in the set of radio resources using the selected TBS.

7. The circuitry according to claim 5, wherein the controller circuitry is further configured in combination with the transceiver circuitry to:
receive, from the infrastructure equipment, an allocation of a set of radio resources to be used for retransmission of the random access procedure message, the set of radio resources being large enough for the random access procedure message to be transmitted using the maximum TBS;
receive an indication that the repetition number, that should be used for the retransmission of the random access procedure message, should be associated with the maximum TBS; and
retransmit the random access procedure message to the infrastructure equipment in the set of radio resources using the selected TBS and the repetition number associated with the selected TBS.

8. The circuitry according to claim 5, wherein the controller circuitry is further configured in combination with the transceiver circuitry to:
receive, from the infrastructure equipment, an allocation of a set of radio resources to be used for retransmission of the random access procedure message, the set of radio resources being large enough for the random access procedure message to be transmitted using the maximum TBS;
receive an indication of a repetition number that should be used for the retransmission of the random access procedure message; and
retransmit the random access procedure message to the infrastructure equipment in the set of radio resources using the selected TBS and the indicated repetition number.

9. The circuitry according to claim 5, wherein the controller circuitry is further configured in combination with the transceiver circuitry to:
receive, from the infrastructure equipment, an allocation of a set of radio resources to be used for retransmission of the random access procedure message, the set of radio resources being large enough for the random access procedure message to be transmitted using the selected TBS;
receive an indication of a repetition number that should be used for the retransmission of the random access procedure message; and
retransmit the random access procedure message to the infrastructure equipment in the set of radio resources using the selected TBS and the indicated repetition number.

10. The circuitry according to claim 5, wherein the controller circuitry is further configured in combination with the transceiver circuitry to:
receive, from the infrastructure equipment, an allocation of a set of radio resources to be used for retransmission of the random access procedure message;
receive an indication that the maximum TBS should be used for the retransmission of the random access procedure message; and
retransmit the random access procedure message to the infrastructure equipment in the set of radio resources using the selected TBS and the repetition number associated with the selected TBS.

11. The circuitry according to claim 5, wherein the controller circuitry is further configured in combination with the transceiver circuitry to:
receive, from the infrastructure equipment, an allocation of a set of radio resources to be used for retransmission of the random access procedure message;
receive an indication that the maximum TBS should be used for the retransmission of the random access procedure message;
receive an indication of a repetition number that should be used for the retransmission of the random access procedure message;
apply a scaling factor to the indicated repetition number to generate a scaled repetition number, the scaling factor having been applied to the repetition number associated with the selected TBS for the initial transmission of the random access procedure message; and
retransmit the random access procedure message to the infrastructure equipment in the set of radio resources using the selected TBS and the scaled repetition number.

12. The circuitry according to claim 5, wherein the controller circuitry is further configured in combination with the transceiver circuitry to:
receive, from the infrastructure equipment, an allocation of a set of radio resources to be used for retransmission of the random access procedure message;
receive an indication that the selected TBS should be used for the retransmission of the random access procedure message; and
retransmit the random access procedure message to the infrastructure equipment in the set of radio resources using the selected TBS and the repetition number associated with the selected TBS.

13. The circuitry according to claim 5, wherein the controller circuitry is further configured in combination with the transceiver circuitry to:
receive, from the infrastructure equipment, an allocation of a set of radio resources to be used for retransmission of the random access procedure message;

receive, from the infrastructure equipment, an indication that the communications device should retransmit the random access procedure message using a different starting transmission time from the selected starting transmission time; and retransmit the random access procedure message to the infrastructure equipment in the set of radio resources using the selected TBS and the repetition number associated with the selected TBS at another starting transmission time from the set of one or more permitted starting transmission times associated with the selected TBS other than the selected starting transmission time for the transmission of the random access procedure message.

14. The circuitry according to claim 5, wherein the controller circuitry is further configured in combination with the transceiver circuitry to:

receive, from the infrastructure equipment, an allocation of a set of radio resources to be used for retransmission of the random access procedure message;

generate a random number;

compare the random number with a probability threshold; and retransmit the random access procedure message to the infrastructure equipment in the set of radio resources using the selected TBS and the repetition number associated with the selected TBS, wherein dependent on a comparison, the random access procedure message is retransmitted at another starting transmission time from the set of one or more permitted starting transmission times associated with the selected TBS other than the selected starting transmission time.

15. The circuitry according to claim 14, wherein the probability threshold is predetermined and known to the communications device.

16. The circuitry according to claim 14, wherein the probability threshold is indicated to the communications device by the infrastructure equipment along with the allocation of the set of radio resources.

* * * * *